United States Patent
Bompard

(10) Patent No.: US 7,301,570 B2
(45) Date of Patent: Nov. 27, 2007

(54) IMAGE CORRECTION BY COMBINING RESULTS OF MULTIPLE LINEAR FILTERS, WHERE EXTREME LINEAR FILTER VALUES ARE ELIMINATED

(75) Inventor: Frederic Bompard, Massy (FR)

(73) Assignee: NXP B.V., Eindhoven (NL)

( * ) Notice: Subject to any disclaimer, the term of this patent is extended or adjusted under 35 U.S.C. 154(b) by 654 days.

(21) Appl. No.: 10/104,911

(22) Filed: Mar. 22, 2002

(65) Prior Publication Data

US 2002/0145673 A1    Oct. 10, 2002

(30) Foreign Application Priority Data

Mar. 27, 2001   (FR)   .................................. 01 04108

(51) Int. Cl.
   *H04N 9/64*   (2006.01)
   *H04N 3/14*   (2006.01)
   *H04N 5/228*  (2006.01)

(52) U.S. Cl. ..................... 348/246; 348/273; 348/222.1

(58) Field of Classification Search ................ 348/234, 348/235, 236, 237, 238, 252, 253, 266, 272, 348/273, 222.1, 246; 358/530, 532, 533; 382/260, 263, 264, 266

See application file for complete search history.

(56) References Cited

U.S. PATENT DOCUMENTS 6,404,918 B1 *   6/2002   Hel-or et al. ................ 382/167
6,741,754 B2 *   5/2004   Hamilton, Jr. .............. 382/275
6,809,765 B1 *  10/2004   Tao ............................. 348/273

FOREIGN PATENT DOCUMENTS

JP        11262025        9/1999

* cited by examiner

*Primary Examiner*—Lin Ye
*Assistant Examiner*—Justin P Misleh

(57) ABSTRACT

A camera is in the form of a sensor (3) composed of light-sensitive elements arranged in a matrix, and at least a first filtering device (10) for processing the signals issuing from said sensitive elements. The filtering device (10) includes a plurality of linear filters (Fmd1, Fmd2, Fdg1, . . . Fdg6) corresponding to medians and diagonals with respect to the sensor for supplying a plurality of filtering indications. An elimination device (14) eliminates the extreme results of these indications and an estimation device (16) supplyies a valid indication from the non-eliminated indications. Thus, the faulty sensitive elements of the sensor (3) do not degrade the images excessively.

5 Claims, 1 Drawing Sheet

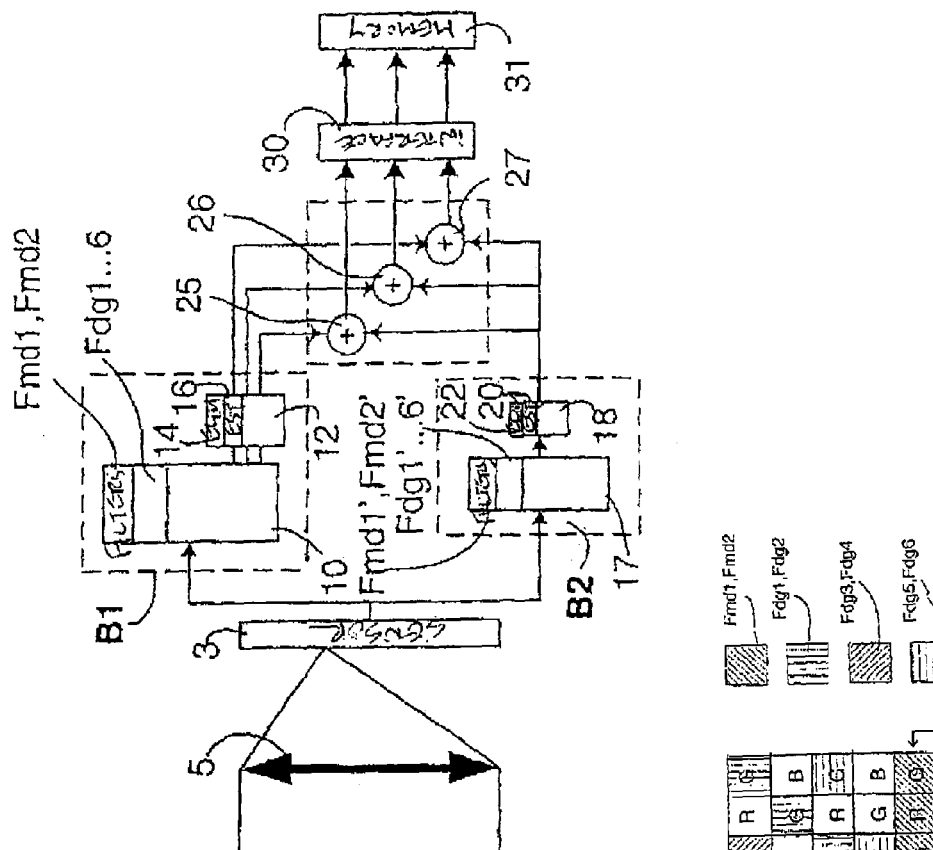
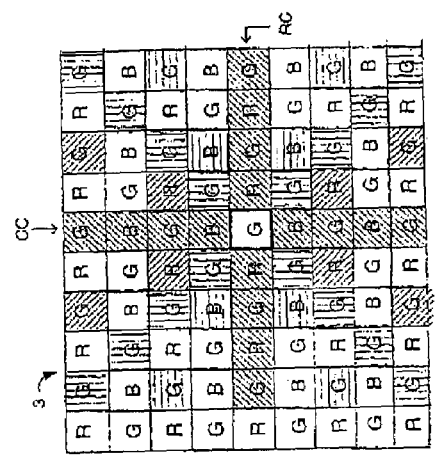
Fig.2

IMAGE CORRECTION BY COMBINING RESULTS OF MULTIPLE LINEAR FILTERS, WHERE EXTREME LINEAR FILTER VALUES ARE ELIMINATED

The invention relates to a camera in the form of a sensor composed of light-sensitive elements arranged in a matrix, and at least a first filtering device for processing the signals issuing from said sensitive elements.

The invention also relates to a method of processing the images taken by such an apparatus.

A problem which is posed with this type of apparatus is that it is difficult to obtain a sensor free from faults. These sensors are formed by a plurality of elements sensitive to visible radiation, disposed in a matrix. Various layers of color filters deposited on them make them sensitive, selectively, to various components of the physical spectrum, for example to the colors yellow, red and blue. It is during the manufacturing process that the defects occur. These defects can fall in various categories:

A first category of defect is an isolated defect occurring on a single point of the sensor.

A second category is a group defect involving several adjacent points of the mosaic. This second category of defect results from the molding process.

A third category is a color defect involving several points of the same color. This category occurs during the process of placing the color filters.

A fourth category is a column defect involving several points on the sensor situated in the same column.

In Japanese patent document JP 11-262025, an appliance of the type mentioned above in the preamble is described. According to this document the defects are corrected color by color using a previously filled table containing the exact positions of the defective pixels.

The present invention proposes an apparatus of the type mentioned in the preamble which deals with the correction of defects according to another approach and which eliminates or greatly attenuates the effects of the defects due to the faulty points on the sensor, notably those described by the aforementioned categories.

For this purpose, such an apparatus is characterized in that the filtering device includes a plurality of linear filters corresponding to directions considered on the sensor for supplying a plurality of filtering indications, an elimination device for eliminating the extreme results of the various linear filters and an estimation device for supplying an indication from the non-eliminated filters.

A method of processing the images taken by an apparatus of the type mentioned in the preamble is characterized in that it includes the following steps:

matrix filtering of the image for each of its points in a plurality of directions, estimation of the filtering value for each of these directions, elimination of the extreme filtering values, estimation of the value to be given to the current point of the image by effecting a combination of means of the non-eliminated filtering values.

The idea of the invention therefore consists of using the luminance and therefore all the information coming from all the points on the sensor.

The invention will be further described with reference to examples of embodiment shown in the drawings to which, however, the invention is not restricted:

FIG. 1 shows a diagram of the apparatus according to the invention.

FIG. 2 shows the organization of the sensor.

In FIG. 1, a camera according to the invention has been depicted. The reference 3 indicates the sensor including a plurality of elements sensitive to various components, arranged in a matrix. The subject 4 is focused on this sensor, which is obtained by means of a lens 5. The camera has a first filtering device 10 effecting various filtering operations.

At the output of the sensor, it is possible to collect various signals corresponding to each of said color components. These various color components undergo a filtering operation performed by the first filtering device 10 (FIG. 1) forming part of a first branch B1. This operation consists of a filtering in two dimensions 2D.

According to the invention this filtering device 10 has a plurality of linear filters Fmd1, Fmd2, Fdg1 to Fdg6 corresponding to directions considered on the sensor for supplying a plurality of filtering indications. These directions are medians and various diagonals. These various linear filters supply various items of information relating to an image point. A branch output device 12 has an elimination device 14 designed to eliminate the extreme results of various linear filters and an estimation device 16 for supplying an indication from the non-eliminated filters.

According to another embodiment, the apparatus is formed by two processing branches: a first branch B1 which relates to the processing related to the color for which the elements have been sensitized and which includes the aforementioned elements, and a second branch B2 which relates to processing without consideration of color. The purpose of this second branch is to supply more details on the image, since it processes the upper part of the spectrum of the image without taking account of the color, the eye being more sensitive to transitions in the luminance rather than color transitions. In this branch B2, there is a filtering device 17 including filters Fmd1', Fmd2', Fdg1' to Fdg6' which operate in a similar manner to the filters of the device 10, but are adapted to the requirements of the processing of the branch B2. What will be stated for the filters Fmd1, Fmd2, Fdg1 to Fdg6 with regard to correction, will apply to the filters Fmd1', Fmd2', Fdg1' to Fdg6'. There is also an output device 18 having an elimination device 20 which is also designed to eliminate the extreme results of various linear filters and an estimation device 22 for supplying an indication from the non-eliminated filters.

The information supplied by these two branches are simply added to the adder means 25, 26 and 27, which add respectively the values relating to the color components processed by the branch B1 to the luminance information supplied by the branch B2. An interfacing device 30 processes these added signals with a view to storing them in an image memory 31.

FIG. 2 explains the directions of the filters. This Figure shows the arrangement of the various elements of the sensor with their sensitivity to the three primary colors:

blue, these elements are indicated by the letter "B" in FIG. 2 red, these elements are indicated by the letter "R" in FIG. 2 green, these elements are indicated by the letter "G" in this same FIG. 2.

The various filters operate in 8 directions, this being represented by the various hatching patterns.

The filters Fmd1 and Fmd2 are filters which operate respectively on the horizontal and vertical medians.

The filters Fdg1 and Fdg2 operate on the main diagonals at 45° with respect to the directions of the filters Fmd1 and Fmd2.

The filters Fdg3 and Fdg4 operate on the diagonals at 22.5° with respect to the vertical median.

The filters Fdg5 and Fdg6 operate on the diagonals at 22.5° with respect to the horizontal median.

These filters are produced, for example, from a square matrix of 9×9 coefficients centered on the image point to be processed.

The functioning of the invention is as follows.

The various output signals of the aforementioned filters are designed to estimate the value of the central pixel placed on the column CC and the row RC. The magnitudes of these various output signals are classified. The extreme values are eliminated. The value of the pixel is then the result of the mean of the other output signals. The eliminated extreme values can be considered to be due to a defect in the sensor.

The invention claimed is:

1. A camera comprising:
    a sensor composed of light-sensitive elements arranged in a matrix and sensitive to light within an image spectrum;
    at least a first filtering device for processing the signals issuing from said sensitive elements, comprising a plurality of linear filters for supplying a respective plurality of output signals, each linear filter acting upon signals from a different plurality of selected light-sensitive elements arranged along a line with respect to the sensor and selected based on the respective positions of the selected light-sensitive elements with respect to a particular light-sensitive element;
    an elimination device for classifying output signals of the linear filters relative to each other, for identifying extreme output signals of one or more linear filters that are either greater than or less than output signals of all other linear filters whose output signals have not been identified as extreme output signals, and for eliminating the extreme output signals; and
    an estimation device for supplying an estimated image value for the particular light-sensitive element produced by combining a plurality of remaining output signals not previously eliminated as being extreme output signals.

2. A camera as claimed in claim 1, comprising a first branch for filtering color information and a second branch for filtering luminance information within an upper part of the image spectrum, wherein the plurality of filters is placed in the first branch.

3. A camera as claimed in claim 1, comprising a first branch for filtering color information and a second branch for filtering luminance information within an upper part of the image spectrum, wherein the plurality of filters is placed in the second branch.

4. A camera as claimed in claim 1, wherein the estimation device estimates a mean of the output signals of the non-eliminated filters.

5. An image-sensing method comprising:
    obtaining sensor signals using a sensor composed of light-sensitive element arranged in a matrix and sensitive to light within an image spectrum;
    processing the sensor signals issuing from said light-sensitive elements using a plurality of linear filters for supplying a respective plurality of output signals, each linear filter acting upon signals from a different plurality of selected light-sensitive elements arranged along a line with respect to the sensor and selected based on the respective positions of the selected light-sensitive elements with respect to a particular light-sensitive element;
    classifying output signals of the linear filters relative to each other;
    identifying extreme output signals of one or more linear filters that are either greater than or less than output signals of all other linear filters whose output signals have not been identified as extreme output signals;
    eliminating the extreme output signals; and
    supplying an estimated image value for the particular light-sensitive element produced by combining a plurality of remaining output signals not previously eliminated as being extreme output signals.

* * * * *